2,806,859
Patented Sept. 17, 1957

2,806,859

L-GLUTAMINE SYNTHESIS

Bruno Vassel, Deerfield, Ill., assignor to International Minerals & Chemical Corporation, a corporation of New York No Drawing. Application August 6, 1954,
Serial No. 448,368

6 Claims. (Cl. 260—345.8)

This invention relates to a method for preparing new glutamic acid derivatives, and more particularly to methods for preparation of glutamic acid derivatives from which optically active natural glutamine is produced.

Known processes for the preparation of L-glutamine have been characterized by difficulties resulting from the complicated series of steps involved, the dangers of the reactants utilized, economically unfeasible manipulations, low yields, and the like. For example, utilizing the carbobenzyloxy method of Bergmann, Zervas, and Salzmann, Berichte 66B, 1288–90 (1933), and the method of Kidd and King, Nature 162, 766 (1948), low yields of the order of 5% to 15% are obtained. Other processes utilized in the past have been characterized by lower yields. Bergmann's method in particular has the further disadvantage of the hazard connected with benzylchloroformate. Upon standing and/or drying, this compound spontaneously decomposes in an explosive manner, and in the past has caused serious injury to workers. There has been need for a commercially feasible process for synthesizing glutamine.

It is an object of the instant invention to provide an improved method for the synthesis of optically active natural glutamine.

It is a further object of the instant invention to provide a method for synthesizing optically active natural glutamine in comparatively high yields without resorting to the resolution of a racemic mixture.

It is a further object of the instant invention to provide an improved synthesis of optically active natural glutamine in which comparatively high yields are obtained using reactants and intermediates which are not hazardous.

It is another object of the instant invention to prepare new compounds from which optically active natural glutamine is produced.

It is another object of the instant invention to provide a commercially acceptable method for the synthesis of optically active natural glutamine.

These and other objects of the instant invention will become more apparent upon a fuller understanding of the invention as hereinafter described.

In accordance with this invention optically active natural glutamine, that is, L-glutamine, is produced by amidating an N-carboallyloxy-L-glutamic anhydride to produce the corresponding N-carboallyloxy-L-glutamine and then removing the carboallyloxy group from the latter compound to produce L-glutamine.

In carrying out the process of this invention utilizing L-glutamic acid as a raw material, L-glutamic acid is reacted with a chloroformate of an allyl compound, such as allylchloroformate( phenallylchloroformate, methallylchloroformate, or other alkallylchloroformate. Reaction of an allylchloroformate compound with L-glutamic acid produces the corresponding N-carboallyloxy-L-glutamic acid believed to have the structural formula

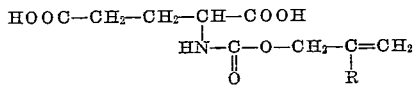

wherein R is selected from the group consisting of hydrogen, alkyl and phenyl, depending upon the particular allyl chloroformate employed. When R is an alkyl group, it is preferably a lower alkyl group, that is, an alkyl group having less than about 8 carbon atoms of either branched chain or straight chain configurations.

The N-carboallyloxy glutamic acid compound is then subjected to a cyclization reaction, for example, by treatment with acetic anhydride, to produce the corresponding N-carboallyoxy-L-glutamic anhydride believed to have the structural formula

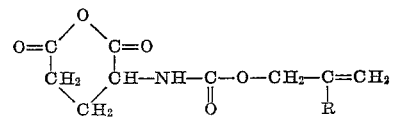

in which R is hydrogen, alkyl or phenyl as described above. The particular carboallyloxy group in the N-carboallyloxy-L-glutamic anhydride will, of course, correspond to the carboallyloxy group of the particular N-carboallyloxy-L-glutamic acid compound utilized in its preparation. N-carboallyloxy-L-glutamic anhydride and N-carbomethallyloxy-L-glutamic anhydride are preferred species of the class described in that they are particularly useful in preparing L-glutamine in accordance with this invention.

In producing L-glutamine according to the process of this invention, an N-carboallyloxy-L-glutamic anhydride is amidated by treatment with liquid ammonia to produce the corresponding N-carboallyloxy-L-glutamine. The N-carboallyloxy-L-glutamine may then be converted into L-glutamine by treatment to remove the carboallyloxy group. By the term "glutamine" as used herein, either alone or in combination with one of more prefixes, is meant L-glutamine.

In one embdomiment of the instant invention, L-glutamic acid is reacted with allyl chloroformate in the presence of a magnesium oxide catalyst. When the reaction has proceeded to substantial completion, the reaction mixture is extracted with chloroform to remove unreacted allyl chloroformate. The aqueous residue is acidified with hydrochloric acid and extracted with a solvent such as n-butanol. The resulting n-butanol solution contains N-carboallyloxy-L-glutamic acid. Treatment of the N-carboallyloxy-L-glutamic acid with a liquid acid anhydride such as acetic anhydride produces the N-carboallyloxy-L-glutamic anhydride of this invention.

In carrying out the instant invention, any suitable allyl chloroformate may be utilized and the term "an allyl chloroformate" as utilized herein refers to unsubstituted allyl chloroformate, alkallylchloroformates, or phenallyl chloroformate. In the case of the allkyl substituted allyl chloroformates, it is preferred that the alkyl substituent be a lower alkyl group, that is, an alkyl group containing less than about 8 carbon atoms. Unsubstituted allyl chloroformate is preferred in carrying out the process of this invention because of the higher yields obtained with the compound.

The terms "an N-carboallyloxy-L-glutamic acid," "an N-carboallyloxy-L-glutamic anhydride," and "an N-carboallyloxy-L-glutamine" refer to N-carboallyloxy derivatives of L-glutamic acid, L-glutamic anhydride, and L-glutamine, respectively, in which the allyloxy group may be an unsubstituted allyloxy group or a phenyl or alkyl substituted allyloxy group in which the alkyl group is a lower alkyl group as described above. The terms "N-carboallyloxy-L-glutamic acid," "N-carboallyloxy-L-glutamic anhydride" and "N-carboallyloxy-L-glutamine" refer to N-carboallyloxy derivatives in which the allyloxy group is unsubstituted.

In accordance with a preferred embodiment of this invention, N-carboallyloxy-L-glutamic anhydride produced by cyclization of N-carboallyloxy-L-glutamic acid is treated with liquid ammonia to produce the corresponding N-carboallyloxy-L-glutamine. The latter L-glutamine derivative is then treated with hydrogen bromide or hydrogen chloride under anhydrous conditions. The product is L-glutamine in the form of a hydrogen halide addition salt. L-glutamine may be recovered from the reaction product mixture by any suitable means. A convenient method involves evaporating the reaction product mixture to dryness, dissolving the residue in methanol, adjusting the pH of the methanol solution to about the iso-electric point of L-glutamine, that is, a pH of about 5.5 by addition of aqueous ammonia, adding acetone in an amount equal to that of the methanol and letting the mixture stand at 0° C. to 10° C. to permit crystallization of the L-glutamine. The L-glutamine crystals may be recovered by filtration.

L-glutamic acid reacts readily with the chloroformate of an allyl compound such as allyl chloroformate, methallyl chloroformate, phenallyl chloroformate, and lower alkyl (methyl, ethyl, propyl) substituted allyl chloroformates. The reaction is exothermic, with the reactants being generally admixed at a temperature between about 0° C. and about 50° C., preferably between about 15° C. and about 35° C. The temperature of the resulting mixture is allowed to rise to about atmospheric temperature and in a preferred embodiment the mixture is agitated at about atmospheric temperature for between about one-half hour and about 2 hours. The resulting reaction products are extracted with a solvent to separate the unreacted allyl chloroformate. An organic solvent, such as chloroform, carbon tetrachloride, methylene chloride or ethylene dichloride is used. The aqueous residue is then acidified, for example, with hydrochloric acid to a pH between about 1.5 and about 2.5. The N-carboallyloxy-L-glutamic acid is extracted from the acidified solution with a solvent such as n-butyl alcohol. In a preferred embodiment, the product is extracted with n-butanol and the n-butanol extract evaporated to dryness.

N-carboallyloxy-L-glutamic acid is then cyclized by treatment with a liquid organic acid anhydride, such as acetic anhydride, to produce N-carboallyloxy-L-glutamic anhydride. This reaction is preferably carried out by dissolving the N-carboallyloxyl-L-glutamic acid in acetic anhydride and then heating the solution rapidly to a temperature up to about 100° C., preferably to about 95° C., and maintaining that temperature for about 5 minutes. Any temperature from about 20° C. to about 100° C. may be utilized. The reaction product mixture is then allowed to cool slowly and the solvent comprising an acetic acid-acetic anhydride mixture is distilled off at reduced pressure and a temperature less than about 65° C.

The N-carboallyloxy-L-glutamic anhydride is then amidated with ammonia to produce the corresponding N-carboallyloxy-L-glutamine. The amidation reaction is carried out using liquid ammonia. A pressure vessel may be employed if desired. Following the reaction, the ammonia is removed from the N-carboallyloxy-L-glutamine, for example by evaporation.

The N-carboallyloxy-L-glutamine is then treated to remove the carboallyloxy group to produce L-glutamine. In one embodiment liquid ammonia and sodium are added to the N-carboallyloxy-L-glutamine, which has been evaporated to dryness, to reduce this compound to L-glutamine. The reduction is substantially complete when the solution becomes a permanent blue color. Ammonia is evaporated from the solution and the residue is dissolved in water. The L-glutamine solution is then acidified to a pH between about 4.5 and about 6.0, preferably about 5.5 with an acid. An acid which forms a sodium or ammonium salt which is soluble in alcohol, such as, for example, hydriodic acid, formic acid, or the like, is employed. An alcohol such as methanol, ethanol or a combination of methanol and acetone or isopropanol, is then added. L-glutamine is insoluble in the alcoholic solution and is separated from the solution. In accordance with another embodiment, N-carboallyloxy-L-glutamine may be treated to remove the carboallyloxy group by treatment with hydrogen and a noble metal catalyst, such as platinum, palladium, rhodium, and the like, or other hydrogenation catalysts such as nickel, etc. The treatment with hydrogen is preferably carried out at room temperatures and superatmospheric pressures.

The following examples represent specific embodiments of the invention. All parts are by weight unless otherwise indicated.

*Example I*

L-glutamic acid in the amount of about 73.5 parts was charged into a reaction vessel along with about 58 parts magnesium hydroxide and about 300 parts water. While the mixture was agitated vigorously, there was added about 150 parts of allyl chloroformate at room temperature. Agitation was continued for about 1.5 hours at about 28° C. and the mixture was then filtered to remove excess magnesium hydroxide. The filtrate was washed with two 150-part portions of chloroform to remove unreacted allyl chloroformate. The extracted filtrate was acidified to a pH of about 1.5 using a 1:1 mixture of water and concentrated hydrochloric acid. The acidified mixture was again extracted with three 162-part portions of n-butanol and the combined butanol extracts were washed with 200 parts of water and then distilled at about 25 mm. Hg from a water bath at about 60° C. The residue was N-carboallyloxy-L-glutamic acid.

The N-carboallyloxy glutamic acid was a viscous sirupy oil having a neutralization equivalent of 118 (theoretical 116) and a nitrogen content of 5.91% (theoretical 6.06%). The refractive index was $n_D^{25}=1.4899$ and the specific rotation was $[\alpha]_D^{28}=-17.4$ (C=4.08; water).

N-carboallyloxy-L-glutamic acid prepared as above in the amount of about 98.6 parts was dissolved in about 300 ml. of acetic anhydride and the solution heated on a steam bath for about 5 minutes at about 95° C. and then allowed to stand in a closed vessel at room temperature for about 1 hour. The solvent was distilled off at about 28 mm. Hg at a temperature of about 60° C. The product which was N-carboallyloxy-L-glutamic anhydride was dissolved in about 184 parts of liquid ammonia over a period of about 1 hour with agitation. After dissolution was complete, the excess ammonia was distilled off under reduced pressure at room temperature and condensed for reuse. The residue remaining after removal of excess ammonia was the ammonium salt of the gamma-amide of N-carboallyloxy-L-glutamic acid. Acidification of the ammonium salt with formic acid produces the gamma-amide of N-carboallyloxy-L-glutamic acid.

The ammonium salt of the gamma-amide of N-carboallyloxy-L-glutamic acid (N-carboallyloxy-L-glutamine) in the amount of about 49.4 parts was dissolved in about 360 parts of liquid ammonia and about 13.8 parts of metallic sodium was added to this solution in the form of small chips. A blue color formed at the end of the reaction. Excess ammonia was expelled under reduced pressure at room temperature and the ammonia vapors condensed for reuse. The residual white solid was treated with about 55 parts of methanol to destroy any unreacted metallic sodium. The suspended solids were dissolved with cooling to below 10° C. in about 160 parts of water and the pH was rapidly adjusted to about 5.5 with approximately 55 parts of 90% formic acid followed by the addition of about 569 parts of methanol. A volume of acetone equivalent to that of the methanol was then added to the mixture. The temperature of the solution was reduced to about —10° C. and allowed to stand. Over a period of 24 to 48 hours a solid crystallized from the mixture, which solid was identified as L-glutamine. The crude L-glutamine which was about 85% pure was dissolved as rapidly as possible in about 9 times its weight of water which had been preheated to about 60° C. to 65° C. The solution was filtered while hot immediately after dissolution was complete and about 158 parts of acetone added to the filtrate. The solution was immediately cooled to 0° C. and filtered after standing for about 1.5 to 2.0 hours. The filter cake was washed with about 8 parts of methanol and dried at about 58° C. The glutamine obtained had a purity of about 98%.

*Example II*

The ammonium salt of N-carboallyloxy-L-glutamine prepared as in Example I in the amount of about 24.7 parts was dissolved in about 105 parts glacial acetic acid by means of warming the mixture to a temperature of about 48° C. with agitation. To the warmed solution was added about 105 parts of a 36% solution of hydrogen bromide in glacial acetic acid. The mixture was allowed to stand at room temperature for about 2 hours with occasional agitation. The reaction mixture was then evaporated to dryness under reduced pressure (about 25 mm. Hg) using a bath temperature of about 58° C. The residue which was a sticky straw-colored mass was dissolved in about 198 parts absolute methanol and the pH of the solution was adjusted to about 5.5 with a 14% aqueous ammonia solution. A volume of acetone equivalent to that of the methanol was then added. After storage of the mixture at about 5° C. for about 2 hours, the crystalline product was filtered and washed with methanol. The yield of L-glutamine amounted to about 9.3 parts and had a purity of about 84%. The crude glutamine was dissolved in about 84 parts of water at a temperature of about 63° C. and was filtered rapidly as soon as the solution was complete. To the filtrate was added about 168 parts of hot acetone (50° C). The mixture was cooled as fast as possible to 0° C. and after about 1.5 hours at this temperature, it was filtered to give crystalline L-glutamine. The recrystallized L-glutamine had a purity of about 91% and the yield amounted to a 91% recovery. By recrystallizing the L-glutamine a second time, utilizing the same procedure, the purity was raised to 96% with a 95% yield.

Having thus fully described and illustrated the character of the instant invention, what is desired to be protected by Letters Patent is:

1. An N-carboallyloxy-L-glutamic anhydride having the structural formula

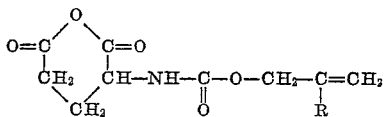

wherein R is selected from the group consisting of hydrogen, alkyl radicals containing fewer than eight carbon atoms, and phenyl.

2. An N-carboallyloxy-L-glutamic anhydride having the structural formula

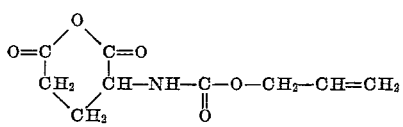

3. An N-carboallyloxy-L-glutamic anhydride having the structural formula

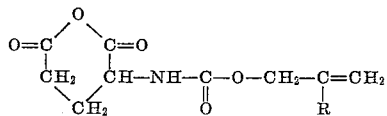

wherein R is a lower alkyl group containing fewer than eight carbon atoms.

4. An N-carboallyloxy-L-glutamic anhydride having the structural formula

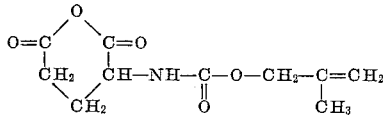

5. In a process for the production of an amide of L-glutamic acid wherein an N-carboallyloxy-L-glutamic anhydride is amidated by reaction with ammonia and the resulting amide is treated to remove the carboallyloxy group, the improvement which comprises effecting said amidation with liquid ammonia, whereby L-glutamine is obtained in high yield, substantially completely free from L-isoglutamine.

6. In a process for the production of an amide of L-glutamic acid wherein an N-carboallyloxy-L-glutamic anhydride is amidated by reaction with ammonia and the resulting amide is treated to remove the carboallyloxy group, the improvement which comprises effecting said amidation by dissolving said N-carboallyloxy-L-glutamic anhydride in liquid ammonia and agitating the resulting solution for about one hour, whereby L-glutamine is obtained in high yield, substantially completely free from L-isoglutamine.

References Cited in the file of this patent

UNITED STATES PATENTS

| 2,395,750 | Muskat et al. | Feb. 26, 1946 |
| 2,508,249 | Gleim | May 16, 1950 |
| 2,523,744 | Warner | Sept. 26, 1950 |

OTHER REFERENCES

Bergmann et al.: Berichte 65, pp. 1192–1201 (1932).
Fox et al.: JACS 72, p. 5087 (1950).
Green et al.: J. Biol. Chem. 197, pp. 772, 777–8 (1952).